(12) United States Patent
Shen et al.

(10) Patent No.: US 8,165,375 B2
(45) Date of Patent: Apr. 24, 2012

(54) METHOD AND SYSTEM FOR REGISTERING CT DATA SETS

(75) Inventors: Hong Shen, Plainsboro, NJ (US);
Andrew Litvin, Waltham, MA (US);
Shuping Qing, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1161 days.

(21) Appl. No.: 11/782,834

(22) Filed: Jul. 25, 2007

(65) Prior Publication Data
US 2008/0137928 A1 Jun. 12, 2008

Related U.S. Application Data (60) Provisional application No. 60/869,357, filed on Dec. 11, 2006.

(51) Int. Cl.
*G06K 9/00* (2006.01)
(52) U.S. Cl. .................... 382/131; 382/294; 128/922
(58) Field of Classification Search .................. None
See application file for complete search history.

(56) References Cited

U.S. PATENT DOCUMENTS

| | | | |
|---|---|---|---|
| 6,019,725 A | 2/2000 | Vesely et al. | |
| 6,611,615 B1 | 8/2003 | Christensen | |
| 6,631,284 B2 | 10/2003 | Nutt et al. | |
| 7,561,728 B2 * | 7/2009 | Abufadel et al. | 382/132 |
| 7,657,072 B2 * | 2/2010 | Periaswamy et al. | 382/128 |
| 2002/0061126 A1 * | 5/2002 | Gerard et al. | 382/128 |
| 2007/0121778 A1 * | 5/2007 | Shen et al. | 378/4 |
| 2007/0127799 A1 * | 6/2007 | Reisman et al. | 382/128 |
| 2007/0173744 A1 * | 7/2007 | Lai et al. | 600/587 |
| 2008/0044074 A1 * | 2/2008 | Jerebko et al. | 382/128 |

OTHER PUBLICATIONS

Rogers et al. (2002) "Application of image registration to measurement of intervertebral rotation in the lumbar spine." Magnetic Resonance in Medicine, vol. 48 pp. 1072-1075.*
Archip et al. (Dec. 2002) "A knowledge-based approach to automatic detection of the spinal cord in CT images." IEEE Trans. on Medical Imiaging, vol. 21 No. 12, pp. 1504-1516.*
Tomazevic et al. (Nov. 2003) "3-d/2-d registration of CT and MR to X-ray images." IEEE Trans. on Medical Imaging, vol. 22 No. 11, pp. 1407-1416.*
Peng et al. (Sep. 2005) "Automated vertebra detection and segmentation from the whole spine MR images." Proc. 27th Conf. on Engineering in Medicine and Biology, pp. 2527-2530.*

* cited by examiner

*Primary Examiner* — Bhavesh Mehta
*Assistant Examiner* — Barry Drennan (57) ABSTRACT

Disclosed is a method and apparatus for registering data points in data sets representing scan data. Data points corresponding to a physical feature represented in the scan data are automatically detected. The detected data points in one data set are correlated with detected data points in another data set. A group of similarity transformations between the correlated detected data points is then calculated. The group of similarity transformations is then combined. In one advantageous embodiment, the physical feature is vertebras.

31 Claims, 10 Drawing Sheets

METHOD AND SYSTEM FOR REGISTERING CT DATA SETS

This application claims the benefit of U.S. Provisional Application No. 60/869,357, filed Dec. 11, 2006, which is incorporated herein by reference.

BACKGROUND OF THE INVENTION

This invention relates generally to digital image processing and more specifically to registration of two or more data sets.

Computer Axial Tomography (CAT), sometimes known generally as Computerized Tomography (CT), is used in many applications, especially medical radiology, to obtain two or three dimensional views of the interior of three dimensional bodies (CT or CAT Scans). The technique involves subjecting a three dimensional body to radiation that enters the body from many different angles. The amount of radiation that is scattered or reflected by the body is then detected as a function of the angle of scattering. The scattered data is then analyzed to construct an image of the interior of the body. A "slice" of the interior can be "reconstructed", for example on a display screen, and viewed. The slice can be reconstructed for any desired angle of intersection with the body.

Image-based computer aided diagnosis (CAD) is a growing area of medical imaging. CAD is a diagnosis based on a comparison between two images (a first image and a second image) of anatomical structures of an individual. Each image is generated from separate data sets. As part of CAD, the data set associated with the first image is correlated with the data set associated with the second image so that a particular area of the first image is correlated with a particular area of the second image. As a result, a user of the CAD diagnosis can use a computer to select a section of the first image and the same section can appear on the second image. With a particular section of the images displayed simultaneously, a visual comparison and analysis can be performed.

The registration of two or more data sets of the same patient is typically important in computer aided diagnosis (CAD) and intervention. Registration of data sets is the correlation of a point in one data set to a point in the other data set.

For example, in the diagnosis of various cancers, one often wants to observe the tumor growth over a period of time. Multiple (e.g., two) scans of the tumor are typically taken to observe the tumor over a period of time. When multiple scans of a single patient are taken, several problems typically arise. First, it is often difficult to match the tumors in two different data sets (associated with two different scans) for a single patient. Second, registration can pose a problem. For example, there may be deformations and displacements due to body motion and body twists during one or more of the scans.

As a result, some type of elasticity is needed in the transformation between two data sets. For example, the transformation should address the motions and twists of the patient's body.

BRIEF SUMMARY OF THE INVENTION

In accordance with an embodiment of the present invention, data points in data sets representing scan data and corresponding to a physical feature represented in the scan data are automatically detected. The detected data points in one data set are correlated with detected data points in another data set. A group of similarity transformations between the correlated data points is then calculated. The group of similarity transformations is then combined. In an advantageous embodiment, the physical feature is a vertebra.

The automatic detection of data points corresponding to a physical feature may include generating slices from the data sets. An initial region of interest in middle slices of the plurality of slices can then be detected. A symmetric axis in the initial region of interest can then be detected.

The automatic detection may include detecting the spinal cord and/or inter-vertebra planes. Detecting the spinal cord can involve fitting circular templates in the region of interest and computing a contrast score from a best-fit circle. Detecting inter-vertebra planes may include estimating a rotation matrix for the similarity transformation. A scaling transform matrix may be added using resolution values for the data sets. An affine matrix can then be estimated.

These and other advantages of the invention will be apparent to those of ordinary skill in the art by reference to the following detailed description and the accompanying drawings.

DETAILED DESCRIPTION

Figure 1:
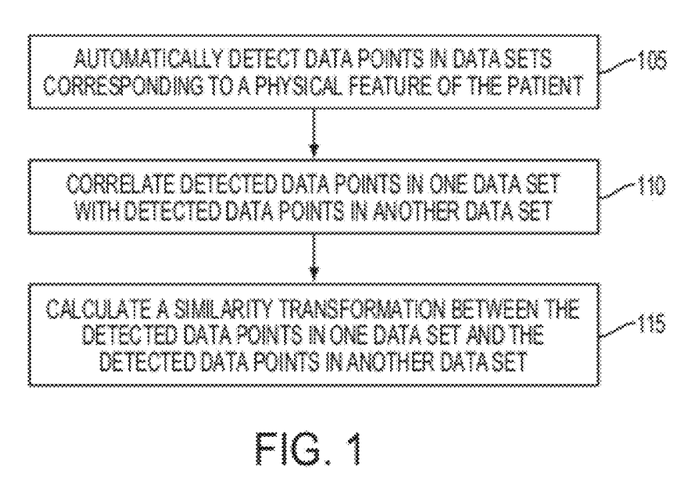
FIG. 1 is a flowchart illustrating the steps performed by a computer to register two or more data sets of the same patient.

FIG. 1 is a flowchart illustrating the steps performed in accordance with an embodiment of the invention to register two or more data sets of the same patient. The registration of points in data sets correlates the points such that each point in one data set maps to a point in the other data set. A portion of an image (e.g., an organ), may be segmented or extracted out from the rest of the image in order to further analyze the portion (e.g., organ). This segmentation typically occurs when an operator, such as a medical professional, selects a seed point, or center point, of the portion to be segmented.

Rather than require a manual selection of a seed point, in accordance with an embodiment of the present invention, data points that correspond with a physical feature of the patient are automatically detected in step 105. In one embodiment, the patient's physical feature is the vertebras of the patient's spine.

For example, the vertebras in the thoracic and abdominal regions can be especially valuable as feature resources for the following reasons. First, they have very complex structures and interfaces to provide distinctive features, such as lines, planes, corners, circles, etc. Second, there are vertebras throughout the chest and abdominal area, which may lead to high coverage for many organs and body sections. Third, the vertebras in the thoracic and abdominal regions have similar but still distinctive shapes which allows the vertebras to be distinguished from one another. Fourth, the vertebra moves when a patient's body twists or turns, thereby making the features of the vertebra relatively stable to body motion.

Once data points in the data sets are detected in step 105, they are correlated in step 110. Once points from one data set are correlated with points in a second data set, a user can use the computer to select a section of the first image and the same section can appear on the second image. With a particular section of the images displayed simultaneously, a visual comparison and analysis can be performed.

Based on the correlation between data points in one data set and data points in a second data set, a similarity transformation is calculated in step 115. In one embodiment, the similarity transformation becomes more accurate as the points from each data set become closer to a vertebra. As described in more detail below, the similarity transformation can be dependent on each point and is therefore a piecewise linear transformation.

Figure 2:
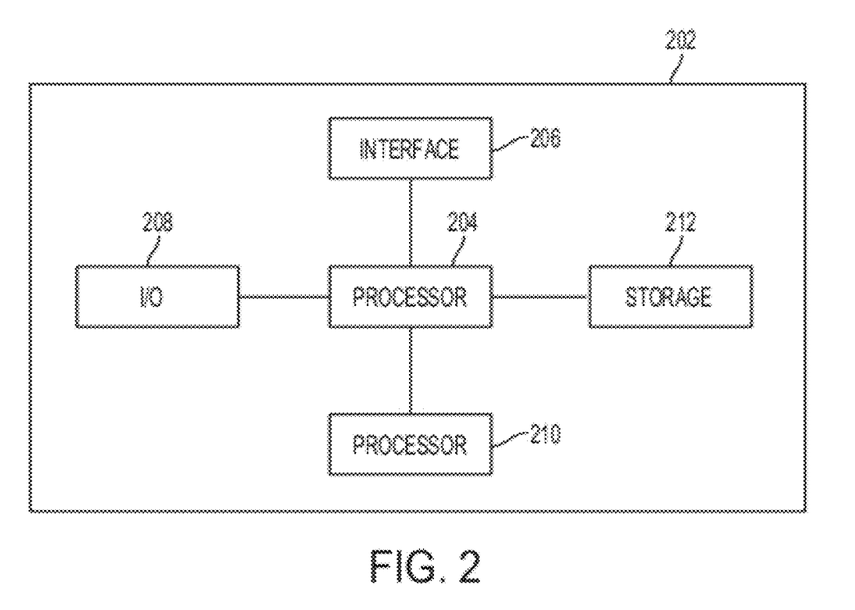
FIG. 2 shows a high level block diagram of a computer in accordance with an embodiment of the present invention.

The embodiments described herein are generally described in terms of manipulating (e.g., detecting, correlating, and calculating a similarity transformation between) data points in a plurality of data sets representing scan data. One skilled in the art will recognize that such manipulations may be, in various embodiments, virtual manipulations accomplished in the memory or other circuitry/hardware of an illustrative computer. Such a computer may be adapted to perform these manipulations, as well as to perform various methods in accordance with the above-described embodiments. An appropriate computer may be implemented, for example, using well known computer processors, memory units, storage devices, computer software, and other components. A high level block diagram of such a computer is shown in FIG. 2. Computer 202 contains a processor 204 which controls the overall operation of computer 202 by executing computer program instructions which define such operation. The computer program instructions may be stored in a storage device 212 (e.g., magnetic disk) and loaded into memory 210 when execution of the computer program instructions is desired. Computer 202 also includes one or more interfaces 206 for communicating with other devices (e.g., locally or via a network). Computer 202 also includes input/output 208 which represents devices which allow for user interaction with the computer 202 (e.g., display, keyboard, mouse, speakers, buttons, etc.).

One skilled in the art will recognize that an implementation of an actual computer will contain other components as well, and that FIG. 2 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

Figure 3A:
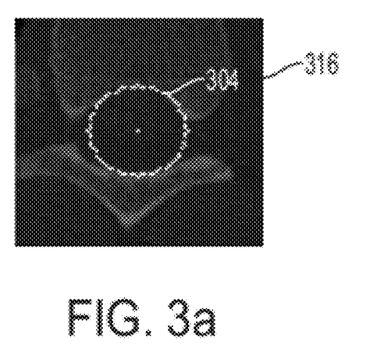
FIGS. 3(a)-3(c) show spinal cord circles overlaid on cropped sample axial images of a scan.
Figure 3B:
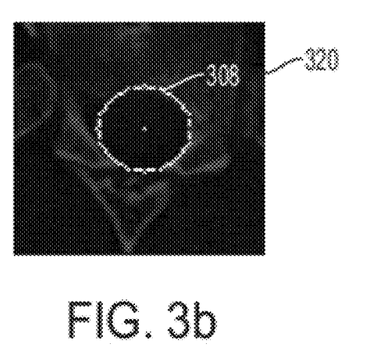
Figure 3C:
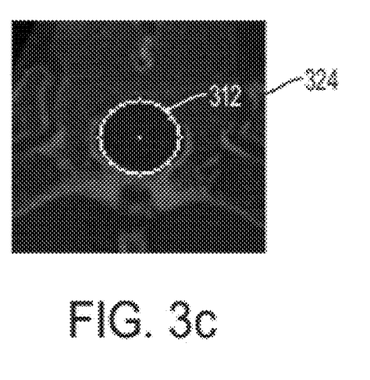
Figure 3D:
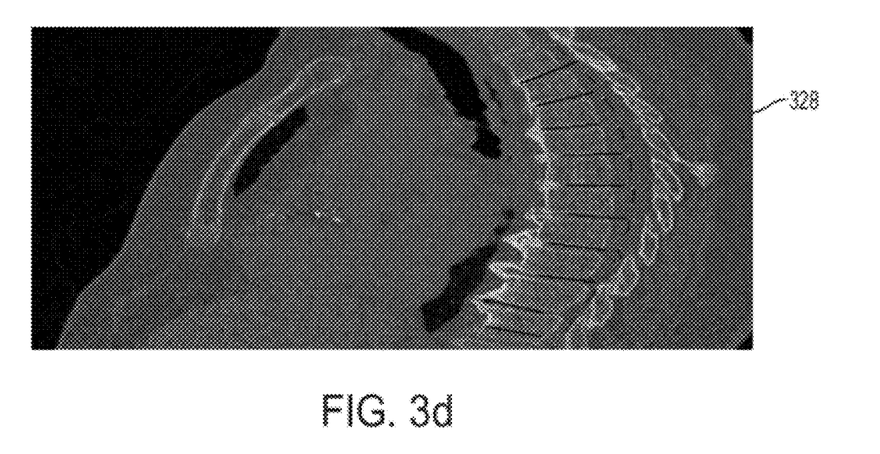
FIG. 3(d) shows inter-vertebral planes and spinal cord centers overlaid on a sample coronal image.
Figure 3E:
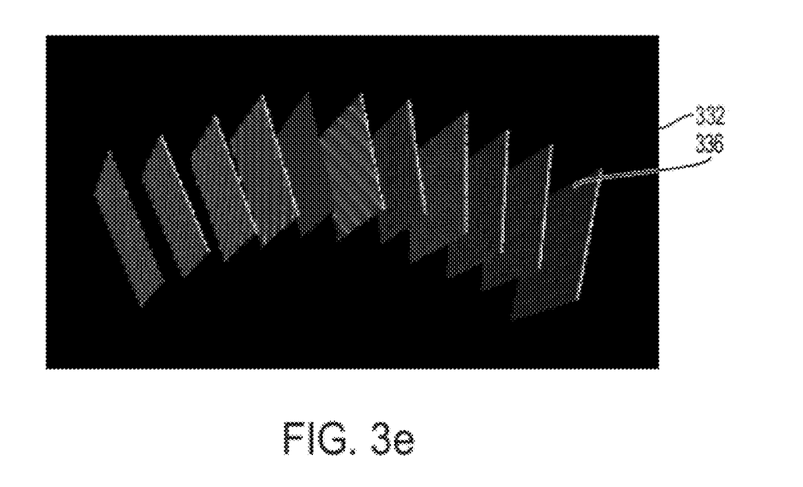
FIG. 3(e) shows a three-dimensional view of the inter-vertebral planes.
Figure 3F:
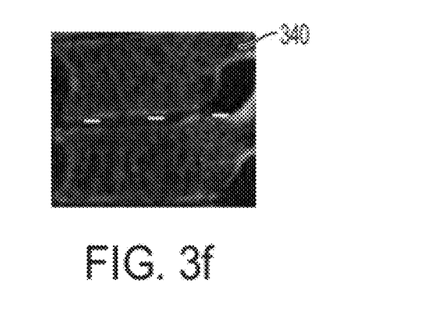
FIG. 3(f) shows a two-dimensional sagal view of the inter-vertebral planes.
Figure 3G:
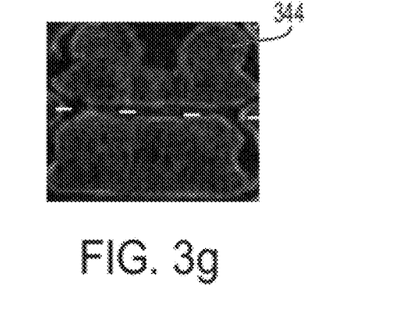
FIG. 3(g) shows a 2D coronal view of the inter-vertebral planes.

FIGS. 3(a)-3(c) show spinal cord circles 304, 308, and 312 overlaid on cropped sample axial images of a scan 316, 320, 324. FIG. 3(d) shows inter-vertebral planes and spinal cord centers overlaid on a sample coronal image 328. FIG. 3(e) shows a three-dimensional (3D) view 332 of the inter-vertebral planes, such as plane 336. FIG. 3(f) shows a two-dimensional (2D) sagittal view 340 of the inter-vertebral planes. FIG. 3(g) shows a 2D coronal view 344 of the inter-vertebral planes.

Figure 4:
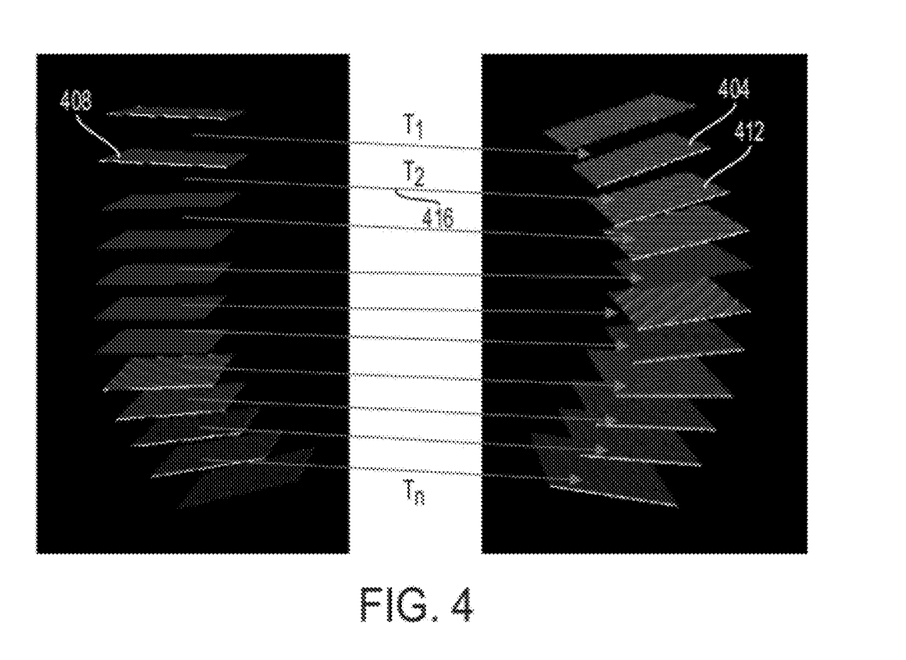
FIG. 4 shows a series of detected inter-vertebra planes extracted from two data sets of the same patient.

In one embodiment, two abdominal data sets of the same patient over time are compared. In each data set, the prominent physical features, such as vertebras, can be extracted or separated out from the rest of the data set. First assume that, for each vertebra in one data set, its counterpart in the other data set is known. FIG. 4 shows a series of detected inter-vertebra planes (e.g., planes 404 and 408) extracted from two data sets of the same patient. Since two adjacent planes (e.g., planes 404 and 412) define the upper and lower limits of a vertebra located in between the adjacent planes (e.g., planes 404 and 412), the planes (e.g., planes 404 and 412) are used to roughly represent the relative positions of the vertebras on a spine. FIG. 4 also shows a series of arrows (e.g., arrow 416) illustrating the corresponding vertebra pairs from the two data sets.

For each pair of corresponding vertebras in the two data sets, salient physical features, such as spinal cord and inter-vertebral planes, are extracted. These corresponding features are then used to estimate a similarity transformation matrix $T_i$, i=1, ... n, where n is the number of pairs of counterpart vertebras that can be found in the two data sets. $T_i$ accurately defines the local geometric transformation for the points on or near the vertebra whose anatomic features are the basis of the estimation of $T_i$. For points on other vertebras or points a predetermined distance apart, the transformation will be less accurate. Therefore to estimate a global transformation for any point x inside the data volume, the weighted sum of all local transformations is determined:

$$T(x) = \sum_{i=1}^{n} \frac{1}{d_i(x)} T_i \Big/ \sum_{i=1}^{n} \frac{1}{d_i(x)},$$

where $d_i(x)$ is the distance from point x to the center of the ith vertebra. Such a transformation is dependent on each point. Therefore, the transformation is not a linear transformation but is rather a piecewise linear transformation.

Figure 5:
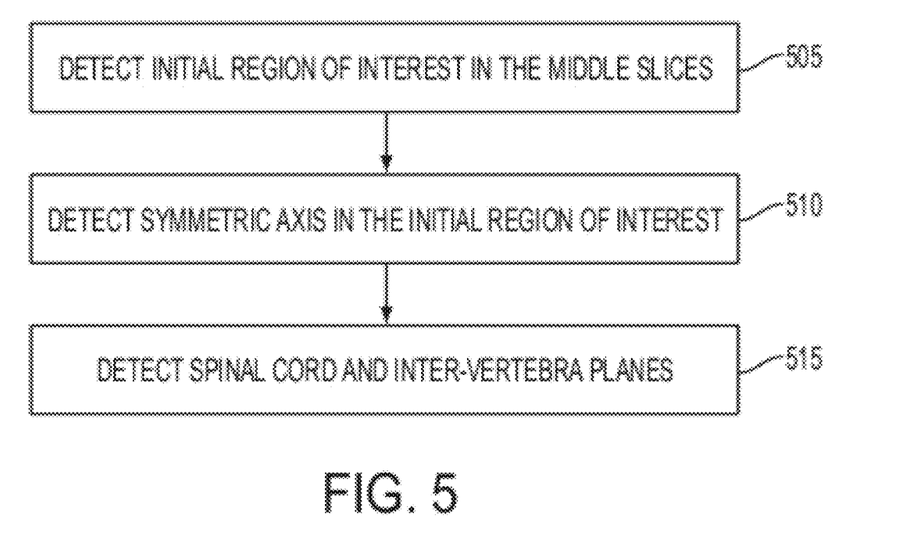
FIG. 5 is a flowchart illustrating the steps performed to detect data points in the data sets corresponding to one or more physical features represented by scan data.

FIG. 5 is a flowchart illustrating the steps performed to automatically detect data points corresponding to one or more physical features (e.g., vertebras) as shown in step 105 of FIG. 1. An initial region of interest in the middle slices of the slices are detected in step 505.

The vertebra features contain the spinal cord and the inter-vertebral planes, as shown in FIGS. 3(a)-(g). In complement to prior art techniques, which require a user to click a location inside one of the vertebras to determine a seed point and then extract the vertebra features, in one embodiment of the invention this location is automatically selected to make the detection of a seed point fully automatic.

In traditional algorithms used to detect the spinal cord, a circular template is used on each axial slice to attempt to locate the best contrast circle (as shown in FIG. 3(a)-(c)). The difference between the average intensity on the outer circle and the inner circle is typically computed. This computation often alters the size and location of the circle template. The best circle is typically the circle with the largest response (i.e., an output fitting a circle template of the image location).

In accordance with an embodiment of the present invention, the best contrast circle in one of the middle axial slices in the data set is determined. After this determination, the circles on the other slices can be carried out from the middle to the two ends of the spine. A region of interest is therefore defined to properly constrain the circle search. The region of interest contains the cord area and is as small as possible.

Figure 6A:
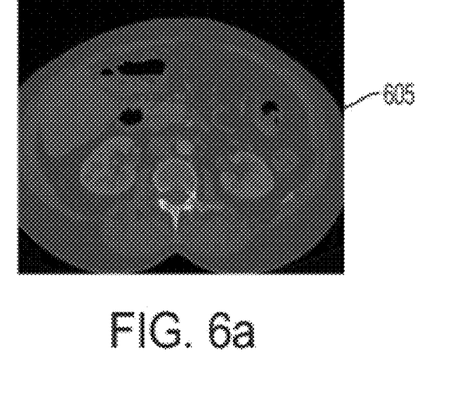
FIGS. 6(a)-(f) are diagrams illustrating the graphical steps performed to determine a region of interest.

FIGS. 6(a)-(f) are diagrams that graphically illustrate the steps performed to determine a region of interest. Three middle axial slices that are separated from each other by a distance of ⅓ of the axial length of a vertebra are chosen. FIG. 6(a) shows one slice 605 of the three slices. Each of these slices is binarized with a threshold (e.g., a threshold of 1300). Binarizing a slice with a threshold into a resulting image means only maintaining pixels having an intensity above the threshold. Thus, the resulting image only maintains objects (pixels) having an intensity above the threshold.

Figure 6B:
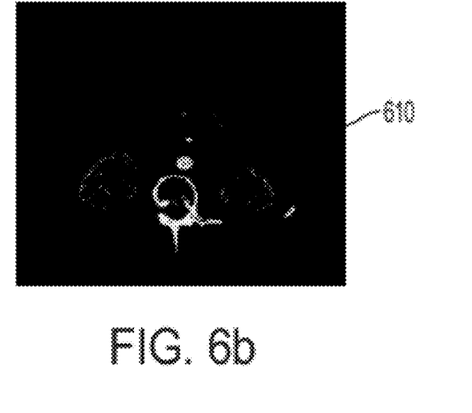
Figure 6C:
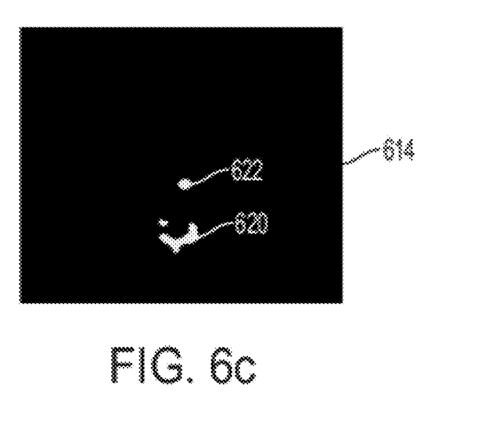
Figure 6D:
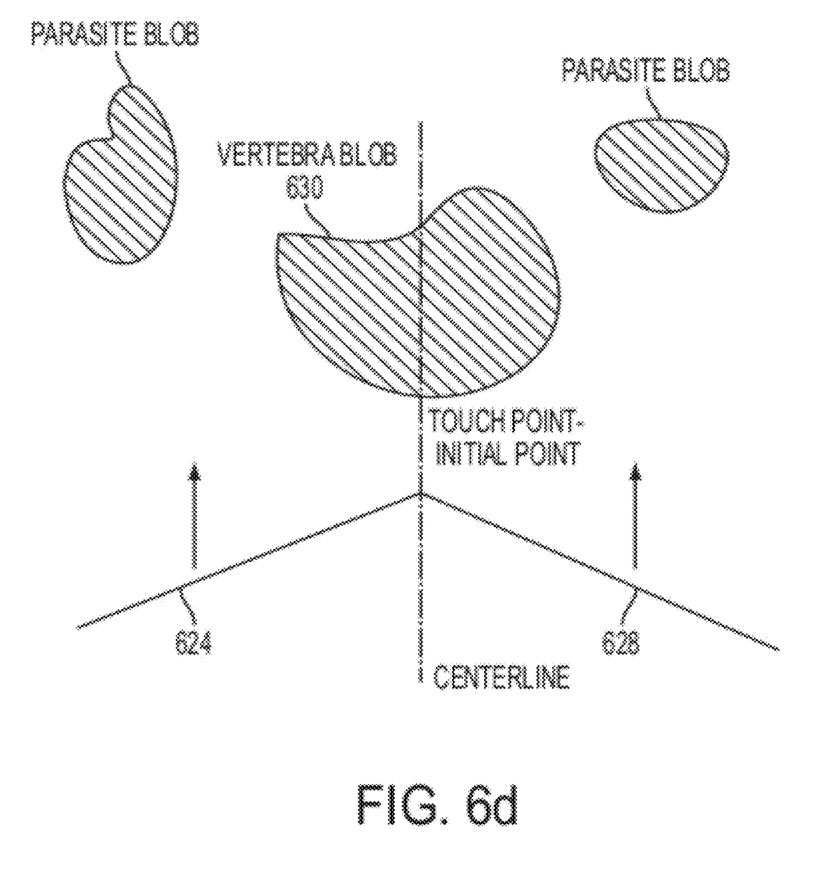
Figure 6E:
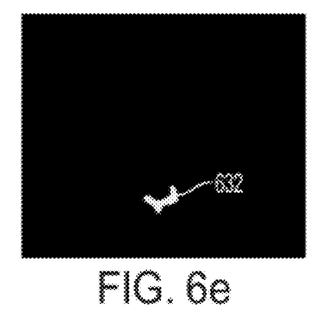

FIG. 6(b) is the binarized image 610 which provides the rough bone structures. Binary image 610 is smoothed with a square uniform kernel. The smoothed image is binarized again to form image 614 of FIG. 6(c). The largest bright area 620 corresponds to the vertebra. Additional bright areas, such as area 622, may be present as a result of rib, tagging and other artifacts. The largest bright area is distinguished from the rest of the image (i.e., from other areas such as area 622) by the method shown in FIG. 6(d). Two lines 624, 628 are defined and are moved upward until they reach a foreground area. The centroid of this foreground area is then computed to identify the vertebra 630. With respect to FIG. 6(c), the vertebra 620 is found using the method of FIG. 6(d) to produce the vertebra 632 alone, as shown in FIG. 6(e).

Figure 6F:
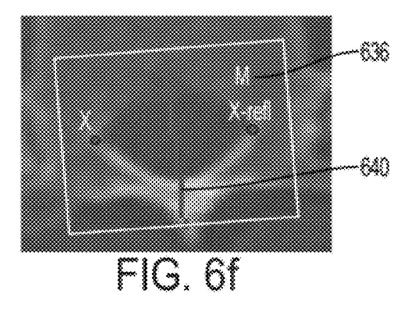

The symmetric axis of the initial region of interest is then detected in step 510 of FIG. 5. Specifically, the vertebra 632 of FIG. 6(e) has axial symmetry in the axial slice. The symmetric axis is therefore detected in the neighborhood of the above computed centroid. Inside a square region of interest M 636 of FIG. 6(f), a line L is searched for that minimizes the following functional that describes the sum of intensity differences on the two sides of L:

$$L^* = \underset{L}{\operatorname{argmin}} \sum_{i,j \in M} |I(x^{ij}) - I(x_{refl}^{ij})|$$

where $x_{ij}$ and $x_{refl}^{ij}$ are in axial symmetry with respect to the axis L. They are among the uniformly sampled points, which are obtained by bi-linear interpolation. A sample result of a detected axis 640 is shown in FIG. 6(f).

Given the above centroid and symmetric axis, the region of interest can be defined on the axial slice. The spinal cord and inter-vertebral planes can then be detected from a data set starting from a given region of interest inside one axial slice in step 515 of FIG. 5. The spinal cord region inside the slice is first detected by fitting circular templates in the region of interest, and a contrast score is computed from the best-fit circle shown in FIGS. 3(a)-(c). The center of the circle is taken as the spinal cord center on that slice, and propagated to the neighboring slices to define their regions of interests, thereby defining new regions of interest. This process repeats recursively along the spine. During and after this process, dominant harmonic running window filtering of contrast score function can be applied. Further, a "chirp" parametric signal model can be applied to recover a smooth quasi-periodic contrast function. Vertebra regions are detected as areas with positive modeled contrast score. The inter-vertebra planes are then detected using contrast line fitting and robust median plane searching scheme with reference to the detected cord locations.

In one embodiment, in step 110 of FIG. 1, the correlation of detected data points in one data set with detected data points in another data set involves determining vertebra correspondences. To estimate the local linear transformations from pairs of corresponding vertebra features, correspondence between detected vertebra regions is determined.

Figure 7A:
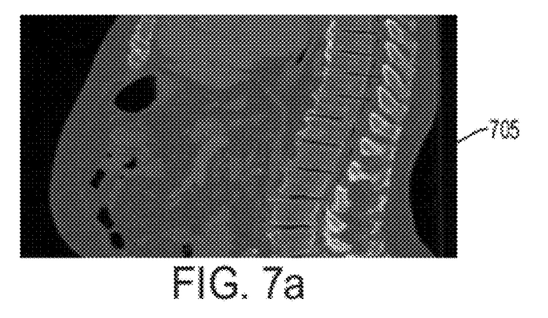
FIGS. 7(a)-(b) show a pair of CT data sets, with detected inter-vertebra planes and cord centers.
Figure 7B:
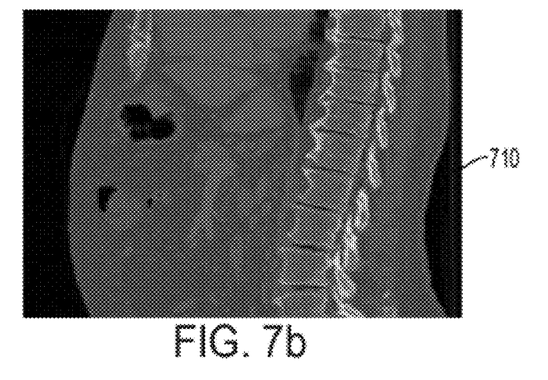

FIGS. 7(a)-(b) show a pair of CT data sets, with detected inter-vertebra planes and cord centers. In particular, FIGS. 7(a) and 7(b) show the detected cord center and inter-vertebral planes overlaid on the coronal view of a pair of follow-up images 705, 710.

Figure 7C:
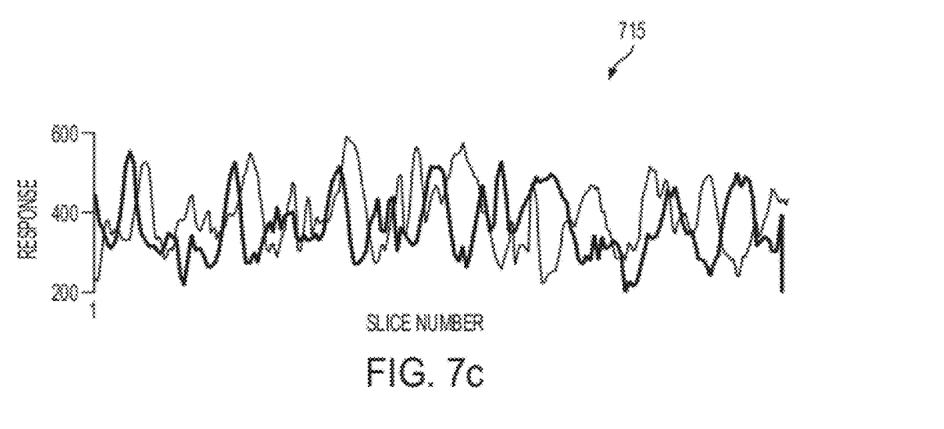
FIG. 7(c) shows response values from the circular template fitting across axial slices in the two data sets.

FIG. 7(c) shows, in graph 715, the response values from the circular template fitting across axial slices in the two data sets. Since the two data sets often have different resolution in the axial direction, the scale in the horizontal axis is normalized to be the same for the two data sets. The response values may carry information about the location of individual vertebras. Shifts along the spinal cord can be recovered by computing cross correlation of response values from the two data sets.

Figure 7D:
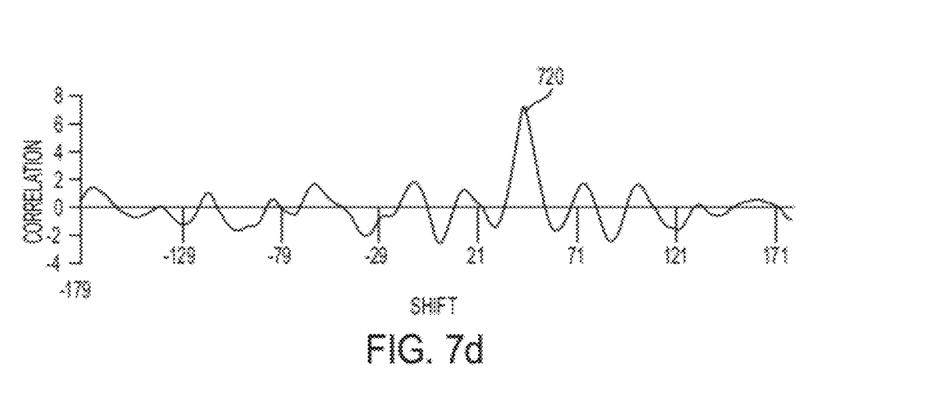
FIG. 7(d) is a graph showing a correlation value peak with respect to the shift in the axial direction.

After rescaling the response values in the axial direction using the known axial resolution values, cross-correlation between the response values, with varying shifts in the axial direction, is computed. The shift with the maximum cross-correlation is taken as the shift along the axial direction. FIG. 7(d) is a graph showing a correlation value peak 720 with respect to the shift in the axial direction. For most of the correlated data points (in the different data sets), the correlation value peak 720 is distinctive.

From the correlation values shown in FIG. 7(d), the vertebra correspondence can be determined. For a given vertebra in one data set, the axial location of its upper inter-vertebra plane is determined. In the other data set, the axial locations of the inter-vertebra planes can be determined. The difference between the axial location between each of the inter-vertebra planes and the inter-vertebra plane in the first data set is then determined. The inter-vertebra plane in the second data set with the location difference closest to the computed shift is selected as the correspondence plane. As a result, the correspondence of vertebra pairs in the two data sets is determined.

As stated above in step 115 of FIG. 1, the similarity transformation is then estimated based on the physical features. Specifically, between each pair of correspondent vertebras, a similarity transformation matrix is estimated from the detected vertebral features. A registration basis is set up from the extracted inter-vertebral features. The registration basis is a coordinate system that includes the origin, the three axes, and scales.

Figure 8A:
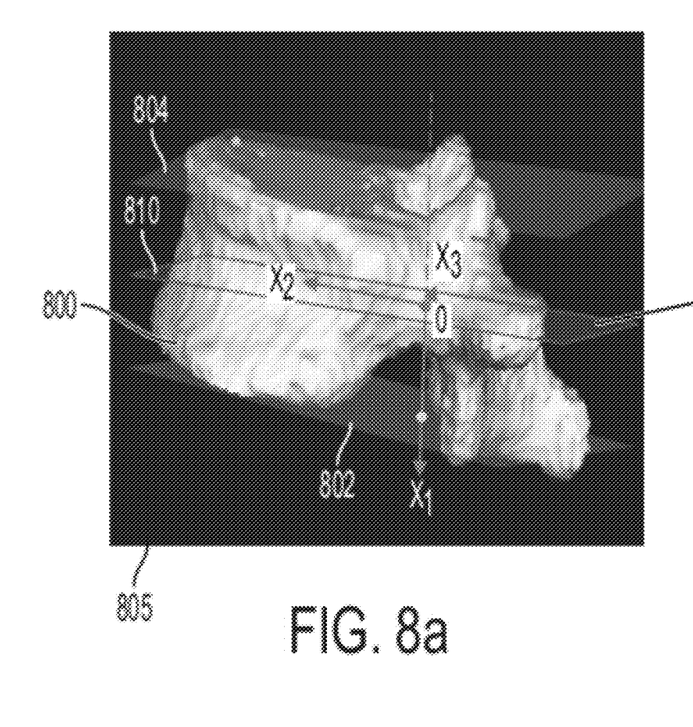
FIG. 8(a) is a three dimensional image illustrating a registration basis showing an isolated vertebra with the top and bottom inter-vertebra planes.

FIG. 8(a) is a three dimensional (3D) image illustrating a registration basis showing an isolated vertebra 800 with the top and bottom inter-vertebra planes 802, 804. Also shown are the origin O and three orthogonal axes of the basis. The origin is defined roughly as the 3D center of the spinal cord of the vertebra, but the exact location is obtained with the 2D cord center location on the top and bottom inter-vertebra planes. These 2D cord centers are detected from the axial slices using cord detection algorithms described above. In the neighborhood of each 2D cord center, a line may be drawn to the 3D locations of the 2D cord centers on a predetermined number of (e.g., 15) consecutive axial slices before and after the current slice. The orientation of the fitted line reflects the local orientation of the spinal cord on this slice. The fitted line also intersects the axial slice, which may not coincide with the 2D cord location detected with the cord detection algorithm. The line fitted for the top most axial slice that contains at least some voxels of the current vertebra intersects the top inter-vertebra plane and therefore is taken as the cord center at the location of the inter-vertebra plane, as shown in FIG. 8(a). Similarly, the cord center at the bottom inter-vertebra plane is obtained. The middle point location of the top and bottom cord locations is taken as the origin O or the 3D cord center of the current vertebra, as shown in FIG. 8(a).

The orientations of the local fitted lines at the two inter-vertebral planes reflect the local cord orientation. The average of these two orientations are taken as the principle orientation of the spinal cord inside this vertebra. It is also taken as the first axis $x_1$ 805 of the coordinate system.

The origin and the first axis 805 uniquely define the plane at the center of the vertebra. The plane passes through the origin and is perpendicular to the first axis 805. In this plane, the 2D image is computed by interpolation of the 3D image points from the original data. In this image, the symmetrical axis is determined as second axis $x_2$ 810 of the registration basis. Third axis $x_3$ 815 can be found by taking the cross-product of the first axis 805 and second axis 810.

Figure 8B:
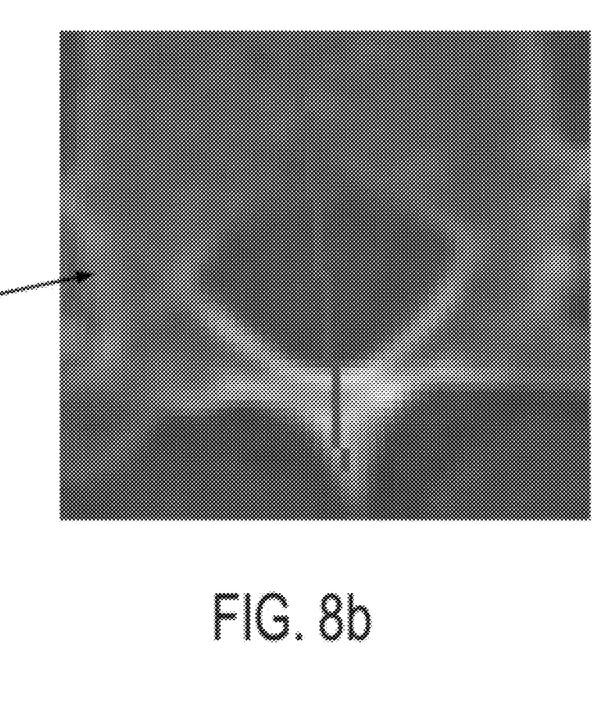
FIG. 8(b) shows an interpolated 2D image on the middle plane shown in FIG. 8(a) and the detected 2D symmetric axis.

FIG. 8(b) shows an interpolated 2D image 850 on the middle plane shown in FIG. 8(a) and the detected 2D symmetric axis.

From the above, the three axes 805, 810, 815 as shown in FIG. 8(a) in each of the two follow-up data sets are precisely defined, and hence establish three pairs of corresponding directions. They are sufficient to estimate the rotation matrix R for the geometric transformation between the two data sets, by solving the following equations:

$$\begin{cases} x_1 = Rx_1 \\ x_2 = Rx_2 \\ x_3 = Rx_3 \end{cases},$$

Afterwards, a scaling transform matrix H is added to the rotation matrix using resolution values for the two datasets. It is a diagonal matrix:

$$H = \begin{pmatrix} s_x & & \\ & s_y & \\ & & s_z \end{pmatrix},$$

where $s_x$, $s_y$, and $s_z$ are the x, y, and z resolution ratios of the two data sets, which are known from the input data. Finally, an affine matrix is estimated as $$X = HRX + (O - O')$$

The transformation is accurate for all locations on the vertebras, and the accuracy decreases when a point moves father away from the spine due to the deformation and motions of organs. The above piecewise linear transformation can be used as a global initial registration that handles the motion due to bending of the body.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer implemented method for registering a plurality of data sets comprising:
   automatically detecting a first set of data points in a first data set and a second set of data points in a second data set, each set of data points corresponding to a physical feature of a patient and each data set corresponding to a different scan of the patient;
   correlating the detected first set of data points with the detected second set of data points;
   calculating a group of similarity transformations between the correlated first set of data points and second set of data points, each similarity transformation of the group of similarity transformations being a piecewise linear transformation between a point of the first set of data points and a correlated point of the second set of data points; and
   combining said group of similarity transformations to obtain a global transformation for any data point in the plurality of data sets.

2. The method of claim 1 wherein said physical feature is a vertebra.

3. The method of claim 1 wherein said automatically detecting a first set of data points and a second set of data points comprises generating a plurality of slices for each of the first set of data points and the second set of data points.

4. The method of claim 3 wherein said automatically detecting a first set of data points and a second set of data points further comprises detecting an initial region of interest in middle slices of said plurality of slices for each of the first set of data points and the second set of data points.

5. The method of claim 4 wherein detecting an initial region of interest comprises detecting a symmetric axis in said initial region of interest.

6. The method of claim 5 wherein detecting an initial region of interest further comprises searching for a line L that minimizes the following function $$L^* = \operatorname*{argmin}_{L} \sum_{i,j \in M} |I(x^{ij}) - I(x_{refl}^{ij})|$$

where $x^{ij}$ and $x_{refl}^{ij}$ are in axial symmetry with respect to said line L.

7. The method of claim 6 wherein said automatically detecting a first set of data points and a second set of data points further comprises automatically detecting a spinal cord.

8. The method of claim 7 wherein said automatically detecting a first set of data points and a second set of data points further comprises fitting circular templates in said initial region of interest and computing a contrast score from a best-fit circle.

9. The method of claim 6 wherein said automatically detecting a first set of data points and a second set of data points further comprises automatically detecting inter-vertebra planes.

10. The method of claim 9 wherein calculating a group of similarity transformations between the correlated first set of data points and second set of data points comprises estimating a rotation matrix for each similarity transformation by solving the equations:

$$\begin{cases} x_1 = Rx_1 \\ x_2 = Rx_2 \\ x_3 = Rx_3 \end{cases}$$

Where $x_1$ is a first axis of a registration basis, $x_2$ is a second axis of said registration basis, $x_3$ is a third axis of said registration basis, and R is a rotation matrix for a geometric transformation between the first data set and the second data set.

11. The method of claim 10 wherein calculating a group of similarity transformations between the correlated first set of data points and second set of data points further comprises adding a scaling transform matrix H to said rotation matrix using resolution values for the first data set and the second data set, where H is a diagonal matrix:

$$H = \begin{pmatrix} s_x & & \\ & s_y & \\ & & s_z \end{pmatrix},$$

where $s_x$, $s_y$, and $s_z$ are x, y, and z resolution ratios of the first data set and the second data set.

12. The method of claim 11 wherein calculating a group of similarity transformations between the correlated first set of data points and second set of data points further comprises estimating an affine matrix as

X=HRX+(0−0')

where 0 is the origin of said registration basis.

13. The method of claim 1 wherein said combining said group of similarity transformations comprises determining a weighted sum of local transformations by:

$$T(x) = \sum_{i=1}^{n} \frac{1}{d_i(x)} T_i \bigg/ \sum_{i=1}^{n} \frac{1}{d_i(x)},$$

where $d_i(x)$ is a distance from point x to a center of an ith vertebra, $T_i$ is a similarity transformation in said group of similarity transformations, and i=1 . . . n, where n is a number of pairs of counterpart vertebras that can be found in the two data sets.

14. An apparatus for registering a plurality of data sets comprising:
means for automatically detecting a first set of data points in a first data set and a second set of data points in a second data set, each set of data points corresponding to a physical feature of a patient and each data set corresponding to a different scan of the patient;
means for correlating the detected first set of data points with the detected second set of data points;
means for calculating a group of similarity transformations between the correlated first set of data points and second set of data points, each similarity transformation of the group of similarity transformations being a piecewise linear transformation between a point of the first set of data points and a correlated point of the second set of data points; and
means for combining said group of similarity transformations to obtain a global transformation for any data point in the plurality of data sets.

15. The apparatus of claim 14 wherein said physical feature is a vertebra.

16. The apparatus of claim 14 wherein said means for automatically detecting a first set of data points and a second set of data points comprises means for generating a plurality of slices for each of the first set of data points and the second set of data points.

17. The apparatus of claim 16 wherein said means for automatically detecting a first set of data points and a second set of data points further comprises means for detecting an initial region of interest in middle slices of said plurality of slices for each of the first set of data points and the second set of data points.

18. The apparatus of claim 17 wherein means for detecting an initial region of interest comprises means for detecting a symmetric axis in said initial region of interest.

19. The apparatus of claim 14 wherein said means for automatically detecting a first set of data points and a second set of data points further comprises means for automatically detecting a spinal cord.

20. The apparatus of claim 19 wherein said means for automatically detecting a first set of data points and a second set of data points further comprises means for fitting circular templates in said initial region of interest and computing a contrast score from a best-fit circle.

21. The apparatus of claim 19 said means for automatically detecting a first set of data points and a second set of data points further comprises means for automatically detecting inter-vertebra planes.

22. The apparatus of claim 14 wherein said means for combining said group of similarity transformations comprises determining a weighted sum of local transformations by:

$$T(x) = \sum_{i=1}^{n} \frac{1}{d_i(x)} T_i \bigg/ \sum_{i=1}^{n} \frac{1}{d_i(x)},$$

where $d_i(x)$ is a distance from point x to a center of an ith vertebra, $T_i$ is a similarity transformation in said group of similarity transformations, and i=1 . . . n, where n is a number of pairs of counterpart vertebras that can be found in the two data sets.

23. A non-transitory computer readable medium comprising computer program instructions capable of being executed in a processor and defining the steps comprising:
automatically detecting a first set of data points in a first data set and a second set of data points in a second data set, each set of data points corresponding to a physical feature of a patient and each data set corresponding to a different scan of the patient;
correlating the detected first set of data points with the detected second set of data points facilitating comparison and analysis of images associated with the detected first set of data points and the detected second set of data points;
calculating a group of similarity transformations between the correlated first set of data points and second set of data points, each similarity transformation of the group of similarity transformations being a piecewise linear transformation between a point of the first set of data points and a correlated point of the second set of data points; and combining said group of similarity transformations to obtain a global transformation for any data point in the plurality of data sets.

24. The non-transitory computer readable medium of claim 23 wherein said physical feature is a vertebra.

25. The non-transitory computer readable medium of claim 23 wherein said step of automatically detecting a first set of data points and a second set of data points comprises generating a plurality of slices for each of the first set of data points and the second set of data points.

26. The non-transitory computer readable medium of claim 25 wherein said step of automatically detecting a first set of data points and a second set of data points further comprises detecting an initial region of interest in middle slices of said plurality of slices for each of the first set of data points and the second set of data points.

27. The non-transitory computer readable medium of claim 26 wherein detecting an initial region of interest comprises detecting a symmetric axis in said initial region of interest.

28. The non-transitory computer readable medium of claim 23 wherein said automatically detecting a first set of data points and a second set of data points further comprises automatically detecting a spinal cord.

29. The non-transitory computer readable medium of claim 28 wherein said automatically detecting a first set of data points and a second set of data points further comprises fitting circular templates in said initial region of interest and computing a contrast score from a best-fit circle.

30. The non-transitory computer readable medium of claim 24 wherein said automatically detecting a first set of data points and a second set of data points further comprises automatically detecting inter-vertebra planes.

31. The non-transitory computer readable medium of claim 23 wherein said combining said group of similarity transformations comprises determining a weighted sum of local transformations by:

$$T(x) = \sum_{i=1}^{n} \frac{1}{d_i(x)} T_i \Big/ \sum_{i=1}^{n} \frac{1}{d_i(x)},$$

where $d_i(x)$ is a distance from point x to a center of an ith vertebra, $T_i$ is a similarity transformation in said group of similarity transformations, and i=1 . . . n, where n is a number of pairs of counterpart vertebras that can be found in the two data sets.

* * * * *